US011943232B2

(12) United States Patent
Vitale et al.

(10) Patent No.: US 11,943,232 B2
(45) Date of Patent: Mar. 26, 2024

(54) MOBILE EQUIPMENT PROVISIONING SYSTEM AND PROCESS

(71) Applicant: VRstudios, Inc., Redmond, WA (US)

(72) Inventors: Kevin Broc Vitale, Rathdrum, ID (US); David E Ruddell, Seattle, WA (US)

(73) Assignee: Kevin Broc Vitale, Rathdrum, ID (US)

( * ) Notice: Subject to any disclaimer, the term of this patent is extended or adjusted under 35 U.S.C. 154(b) by 387 days.

(21) Appl. No.: 17/348,425

(22) Filed: Jun. 15, 2021

(65) Prior Publication Data

US 2021/0400055 A1 Dec. 23, 2021

Related U.S. Application Data

(60) Provisional application No. 63/040,732, filed on Jun. 18, 2020.

(51) Int. Cl.
*G06F 21/00* (2013.01)
*G06T 19/00* (2011.01)
*H04L 9/40* (2022.01)

(52) U.S. Cl.
CPC .......... *H04L 63/108* (2013.01); *G06T 19/006* (2013.01); *H04L 63/0272* (2013.01); *H04L 63/083* (2013.01); *H04L 63/101* (2013.01)

(58) Field of Classification Search
CPC . H04L 63/108; H04L 63/0272; H04L 63/083; H04L 63/101; H04L 63/0876; G06T 19/006
See application file for complete search history.

(56) References Cited

U.S. PATENT DOCUMENTS

| | | |
|---|---|---|
| 9,844,119 B2 | 12/2017 | Mullins et al. |
| 10,169,917 B2 | 1/2019 | Chen et al. |
| 10,444,509 B2 | 10/2019 | Ries |
| 10,593,120 B1 | 3/2020 | Oliver |
| 10,643,394 B2 | 5/2020 | Chen et al. |
| 10,761,839 B1 | 9/2020 | Migoya et al. |
| 2014/0279276 A1* | 9/2014 | Tolcher ................ G06Q 20/12 705/26.81 |
| 2014/0279647 A1* | 9/2014 | Tolcher ............. G06Q 10/0838 705/330 |
| 2016/0227868 A1* | 8/2016 | Mullins ................ G02B 27/017 |
| 2017/0053445 A1* | 2/2017 | Chen .................... H04N 13/398 |
| 2017/0277259 A1 | 9/2017 | Mullins et al. |
| 2020/0143773 A1 | 5/2020 | Tholfsen et al. |
| 2021/0216618 A1* | 7/2021 | Krejci .................... G06F 21/42 |
| 2021/0273944 A1* | 9/2021 | Sundar ................ G06F 3/0426 |

* cited by examiner

*Primary Examiner* — Kendall Dolly
(74) *Attorney, Agent, or Firm* — Rowan TELS LLC

(57) ABSTRACT

A system including a device application, system application, and cloud application carry out a sequence to authenticate an augmented or virtual reality or other device to operate on a network for a temporary period of time. The system enables portability of personal devices for use on various private data networks.

16 Claims, 9 Drawing Sheets

MOBILE EQUIPMENT PROVISIONING SYSTEM AND PROCESS

CROSS REFERENCE TO RELATED APPLICATIONS

This application claims priority and benefit under 35 USC 119(e) to U.S. application Ser. No. 63/040,732, "Mobile Equipment Provisioning System and Process", filed on Jun. 18, 2020, the contents of which are incorporated herein by reference in their entirety.

BACKGROUND

Augmented or virtual reality headsets are generally marketed to individual consumers for in-home use to experience consumer augmented or virtual reality content such as games. Separately, commercial entertainment venues (e.g., family entertainment centers, arcades, etc.) offer premium augmented or virtual reality experiences that typically involve many people in larger physical play spaces, utilizing different shared augmented or virtual reality headsets and controllers provided on-site. It is desirable to enable augmented or virtual reality headset owners to both continue to use their own devices at home, and enable those personal devices to also be securely used and temporarily provisioned in other locations, such as a family entertainment center.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

According to exemplary embodiments, a portable electronic device is recognized, securely provisioned, and conveniently operated on networked systems in different physical locations. Multiple devices may be used simultaneously by multiple users networked through the same real-time application.

Figure 1:
FIG. 1 depicts use cases for the disclosed technology in accordance with various embodiments.

Embodiments of the disclosed system and processes support various use cases, such as users bringing their personal augmented or virtual reality headsets and/or controllers to arcades or family entertainment centers to engage with on-premise experience and events as active players/participants, passive spectators, or active spectators (spectators who aren't players but who can influence or participate in events/activities to some limited extent). Users in any of these roles can also rent equipment or be provided equipment as part of entry to an activity/event (see below). See for example FIG. 1.

Entertainment providers may maintain an inventory of equipment available on-premise from which devices are assigned to user, system, game, or experience on-demand. The inventory may comprise, for example, rental devices, devices issued as part of admission to a facility or event, and devices issued to authorized participants in an event or activity. In one use case, a customer is issued an augmented or virtual reality headset (or glasses) and controller (which may be their phone or a tablet computer) upon entry to the facility, and the system enable dynamical configuration and usage of those devices for interaction with a choice from among multiple experiences, games, and activities.

Rather than maintaining "dedicated" or static assignments of devices to specific attractions or activities, the facility operator maintains an inventory or depot of devices that the system dynamically assigns and configures to attractions and activities on-demand. The system may provide application program interfaces (API's), plug-ins, and/or other interfaces to the temporarily provisioned devices.

The managed devices may comprise one or more processor, networking functionality, and related peripheral components, such as hand controllers. The provisioning is typically temporary, but may also be set as a longer-term persistent setting for the system.

One system embodiment comprises an augmented or virtual reality headset or other device, an on-site management system and private network, and a mobile device such as a cellular phone or tablet. Certain user information and usage statistics may be persistently managed between play locations to which the augmented or virtual reality device is transported. A player profile is established in the system that enables consistent management of play statistics and facilitates networked play amongst multiple users, both from home and when they travel to an interactive application facility.

The technology incorporates enterprise networking technology, combined with "in-application" features and a management system utilized at the remote interactive application facility. The technology may be integrated into new or existing software applications using a Software Development Kit ("SDK"). Each application developed with the SDK may comprise: a system application (logic of the interactive application facility's private network), a device application (logic of a user's augmented or virtual reality device or personal mobile device), and a cloud application (a third-party service hosted on a network accessible online server). The system application compatible computer and network hardware cooperate to temporarily enable secure access to the system components and to a private data network. The device application communicates with the system application using physical symbols (such as QR codes) to initiate an access protocol to the system and network. Temporary provisioning enables network access and delivery of exclusive content or activity for a limited period. This content (the payload) may be delivered or activated using logic incorporated into the SDK. The access period is defined via configuration in the system application.

An exemplary use-case of the technology enables temporary access to exclusive activities and content, for example for promotional, hygienic, or technological benefits. The following example outlines a process from the perspective of a consumer (e.g., device owner or operator) and an operator who controls the system application, who in some cases could also be the consumer.

The consumer transports their augmented or virtual reality all-in-one headset (the "device") to a local entertainment venue (the "facility"). The facility integrates the device into an attraction system, e.g., a private data network. The facility operator enables the consumer to use the device to engage with an interactive experience. The consumer logs into the device application and presents a QR code to the operator. This QR code comprises the identity of the device to temporarily provision on the attraction system. The operator scans the QR code into the system application. The system application configures the network equipment (e.g., WiFi router) and system application with the device identity. The system application then presents a QR code to the consumer. This QR code comprises the encrypted security credentials of the network to join. The consumer uses the device to scan the QR code. The device application prompts the consumer to join the network and accept the payload. The operator then operates the system application to execute the activity corresponding to the payload, for example an augmented or virtual reality game. At this point the operator may end the temporary provisioning or enable additional activities for the same device. If the operator takes no affirmative action to re-provision, the temporary provisioning expires after the specified time (30 minutes).

The core technology comprises three components at a high level, that carry out a unique three-way handshake.
  System application
  Device application
  Cloud application The specialized handshake performs a function similar to WiFi-Protected Setup (WPS) where a device is enabled to join a network through a push-button or PIN code. The handshake may be implemented in software to operate on any WiFi network device with DHCP and a published API or SNMP 3.0. The computer(s) executing the system application utilize the API/SNMP to enable access to the device. The security of this technology is enforced by three principles:
  Physical device proximity (two-way physical scanning medium)
  Remote device authentication (cloud application storage)
  Enforced network time-out period (removes network access)

Figure 2:
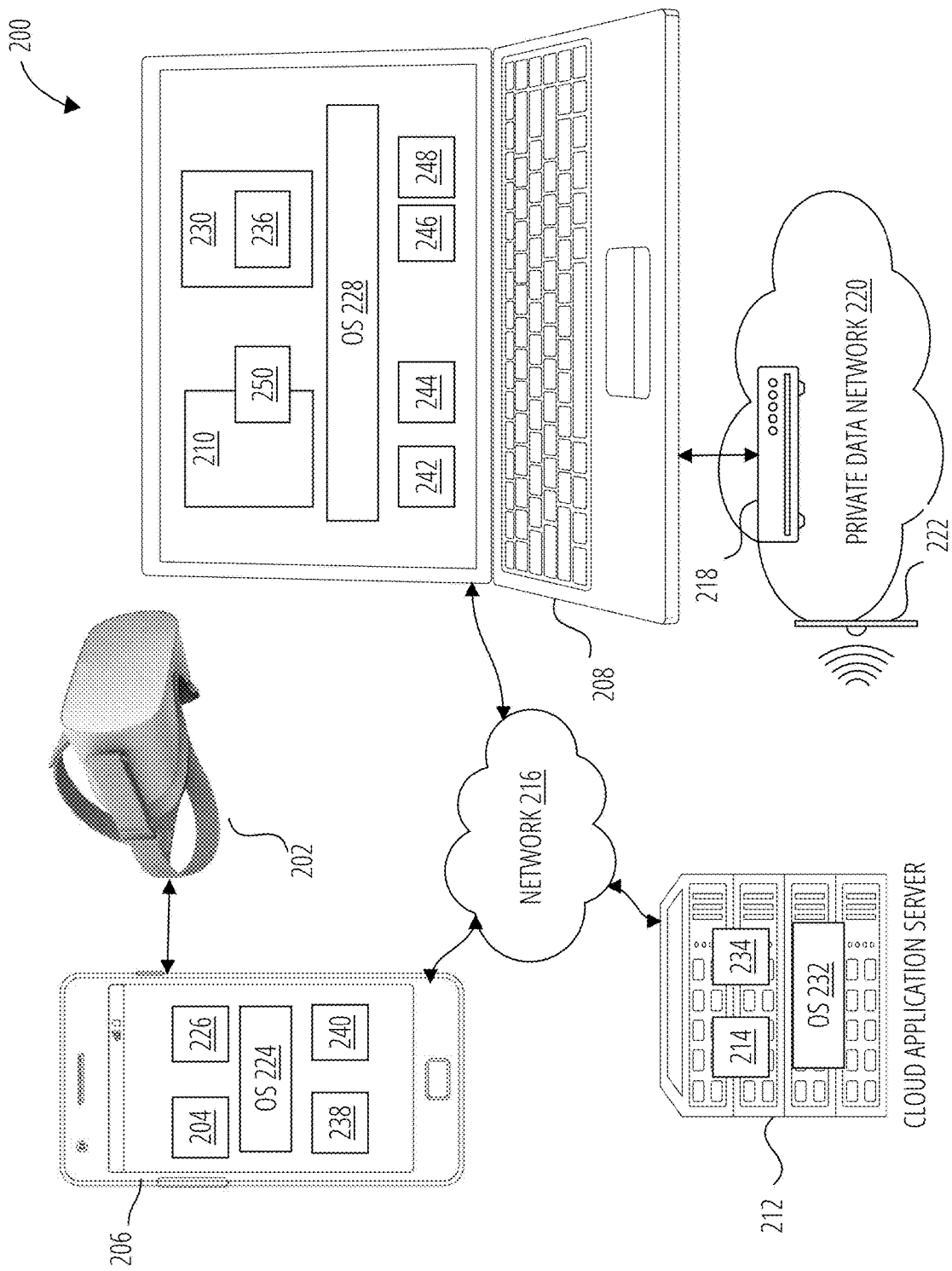
FIG. 2 depicts a system 200 in accordance with one embodiment.

FIG. 2 depicts a system 200 in one embodiment. At a high level, the system 200 comprises an augmented or virtual reality device 202 (Oculus, HoloLens, etc.), a device application 204 executing on a mobile programmable device 206, a system application computer 208 executing a system application 210, and a cloud application server 212 executing a cloud application 214. The mobile programmable device 206, system application computer 208, and cloud application server 212 communicate with one another over a network 216, which may be multiple networks (e.g., a cellular network and the Internet, and/or a local area network and the Internet). The mobile programmable device 206 and the augmented or virtual reality device 202 may communicate with one another wirelessly, e.g., using Bluetooth or other short-range communication technologies.

The components cooperate to configure a router 218 on a private data network 220 and to authenticate the augmented or virtual reality device 202 to a wireless access point 222 on the private data network 220, to enable the augmented or virtual reality device 202 to participate in an interactive game or other interactive activity.

Certain components of the system 200 may in some embodiments be implemented as software comprising instructions executed on one or more programmable device. By way of example, components of the disclosed systems may be implemented as an application, an app, drivers, or services. For example, in one particular embodiment, the cloud application 214 is implemented as a service that executes as one or more processes, modules, subroutines, or tasks on the cloud application server 212 so as to provide the described capabilities to the device application 204 of the mobile programmable device 206 and the system application 210 of the system application computer 208 over the network 216.

The system 200 as depicted comprises various computer hardware devices and software modules coupled by a network 216 in one embodiment. Each device includes a native operating system, typically pre-installed on its non-volatile RAM, and a variety of software applications or apps for performing various functions.

The mobile programmable device 206 comprises a native operating system 224 and various apps or applications (e.g., device application 204 and device app 226). The device application 204 may communicate directly with the augmented or virtual reality device 202 or may communicate with the augmented or virtual reality device 202 through another app or application, such as the device app 226 (which may be specially designed for interacting with the augmented or virtual reality device 202).

A system application computer 208 also includes an operating system 228 that may include one or more library of native routines to run executable software on that device. The system application computer 208 also includes various executable applications (e.g., system application 210 and application 230). The mobile programmable device 206 and system application computer 208 are configured as clients on the network 216. A cloud application server 212 is also provided and includes an operating system 232 with native routines specific to providing a service (e.g., service 234 and cloud application 214) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the system application computer 208, mobile programmable device 206, and/or cloud application server 212. Any of these devices may employ a loader to place the executable and any associated library in memory for execution. The operating system executes the program by passing control to the loaded program code, creating a task or process. An alternate means of executing an application or app involves the use of an interpreter (e.g., interpreter 236).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 238 or driver 240 on the mobile programmable device 206 or system application computer 208 (e.g., driver 242 and driver 244) might enable inputs from and outputs to the augmented or virtual reality device 202. Any of the devices may read and write data from and to files (e.g., file 246 or file 248) and applications or apps may utilize one or more plug-in (e.g., plug-in 250) to extend their capabilities (e.g., to encode or decode video files).

The network 216 in the system 200 can be of a type understood by those skilled in the art, including a Local Area Network (LAN), Wide Area Network (WAN), Transmission Communication Protocol/Internet Protocol (TCP/IP) network, and so forth. These protocols used by the network 216 dictate the mechanisms by which data is exchanged between devices.

Figure 3:
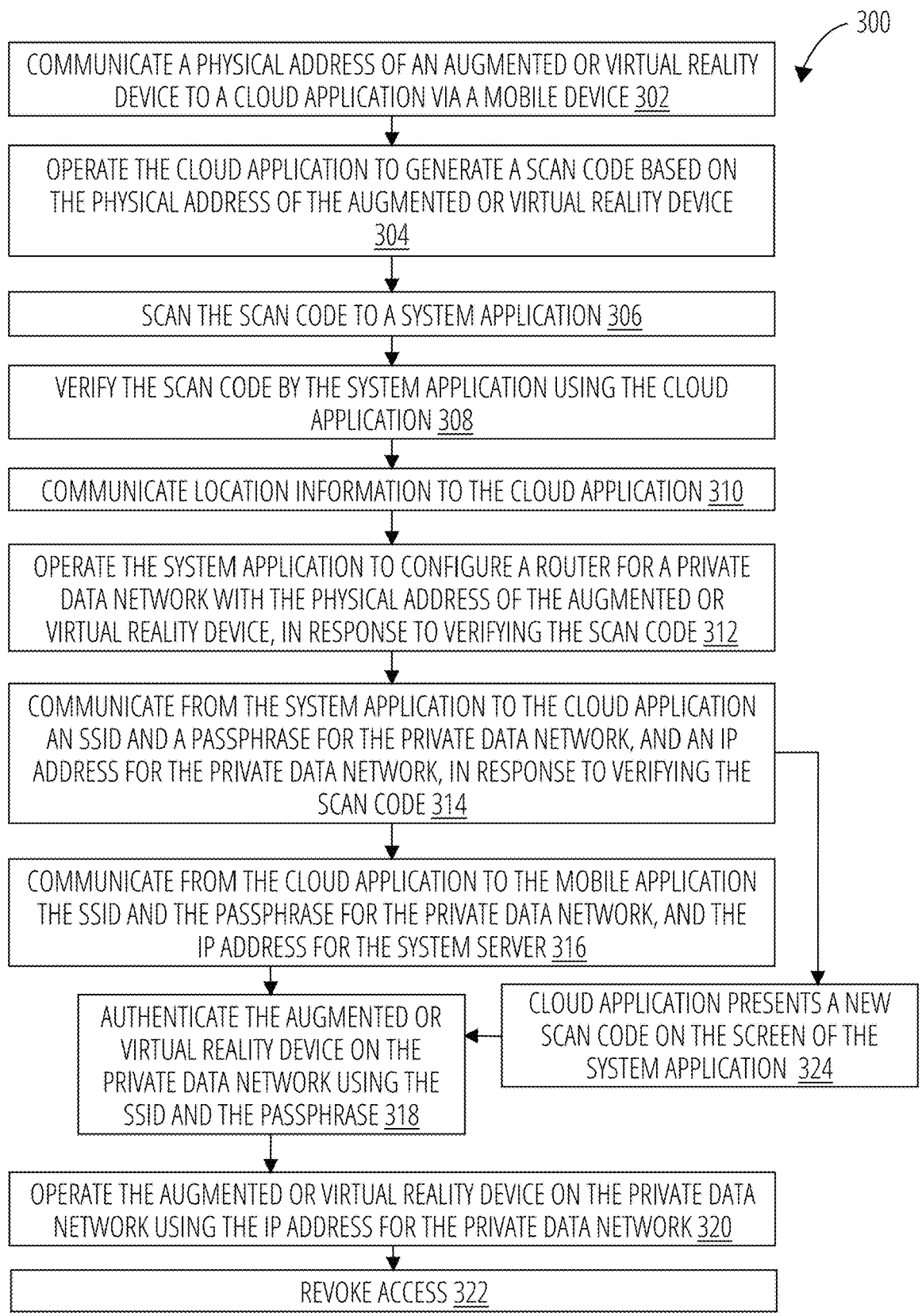
FIG. 3 depicts a routine 300 in accordance with one embodiment.

FIG. 3 depicts a routine 300 for configuring the augmented or virtual reality device 202 to interact with other devices on the private data network 220, in one embodiment. In block 302, a physical address of an augmented or virtual reality device is communicated to a cloud application via a mobile device. In block 304, the cloud application generates a scan code (QR code, bar code etc.) based on the physical address of the augmented or virtual reality device, and possibly additional information from an account of the user of the augmented or virtual reality device. In other embodiments, the cloud application communicates to the device application the account information to encode in the scan code along with the physical address, and the device application generates the scan code. The scan code is a "one time code" that expires after a preconfigured amount of time once used.

The scan code may be formed from various information about the user of the augmented or virtual reality device 202, such as their unique player token (e.g., a temporary JSON web token), the physical address of the augmented or virtual reality device 202. The player token may be generated by hashing information (e.g., user's email address, unique player id, handle or user name, authentication token from user login to profile, etc.) from the player profile stored on the cloud application server 212.

In block 306, the scan code is input (e.g., via optical scanning) to a system application. In block 308, the scan code by the system application verifies the scan code (i.e., authenticates the user of the augmented or virtual reality device 202) using the cloud application. This may be done by passing the user token and the augmented or virtual reality device physical address extracted from the scan code to the cloud application. In block 310, the system application may communicate location information indicating where the scan code is being used to the cloud application. The location information may be used to authenticate the request to verify the scan code and for tracking, in the cloud application, where the scan code is being used.

In block 312, routine 300 the system application configures a router for a private data network with the physical address of the augmented or virtual reality device (e.g., using SNMP), in response to verifying the scan code. This configuration "whitelists" (i.e., prevents blocking of) the augmented or virtual reality device 202 on the private data network.

In block 314, the system application communicates to the cloud application an SSID and a passphrase for the private data network, and an IP address for the private data network, in response to verifying the scan code. In block 316, the cloud application communicates to the mobile application (an app or application executing on the user's mobile programmable device 206) the SSID and the passphrase for the private data network, and the IP address for the system server. Alternatively to block 316, the cloud application may present a new scan code on the screen of the system application comprising the SSID, passphrase and system server IP address at block 324. The mobile device comprising the mobile application, or the augmented or virtual reality device comprising the device application, may then scan the scan code to retrieve the private data network credentials. Unless otherwise indicated, it should be understood that the mobile device may comprise logic to perform some or all aspects attributed to the device application, and vice versa.

In block 318, the augmented or virtual reality device is authenticated on the private data network using the SSID and the passphrase. In block 320, the augmented or virtual reality device operates on the private data network using the IP address for the private data network. After some configured period of time the system application may revoke the access by the augmented or virtual reality device to the private data network by removing configuration of the physical address of the augmented or virtual reality device from the private data network router. In block 322, following a configured timeout period, the cloud application removes the stored data used to create the scan codes from the system. The system application removes the physical address and IP address allocation from the network device (e.g., router), disconnecting the augmented or virtual reality device from the private data network.

Figure 4:
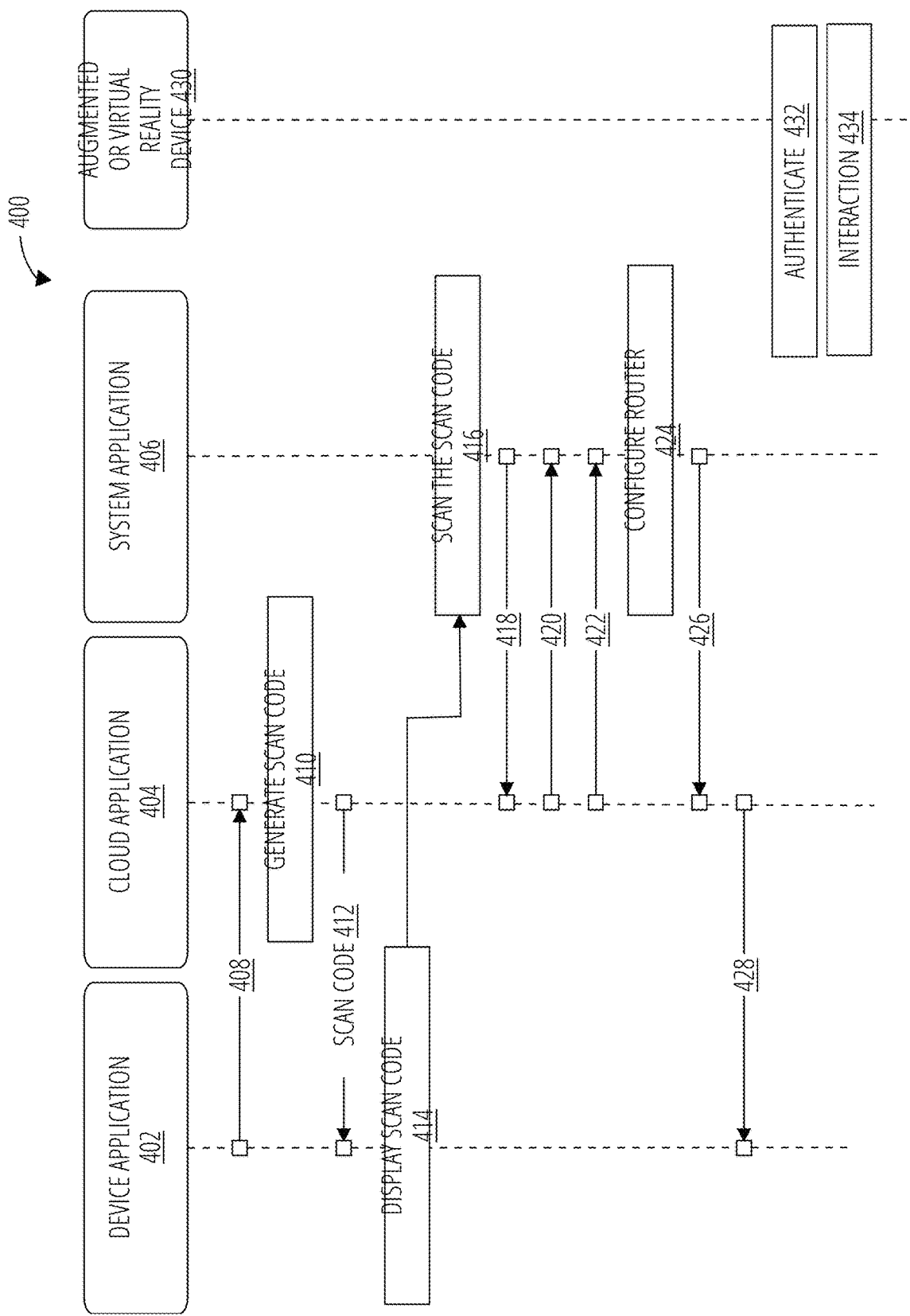
FIG. 4 depicts an operating sequence 400 in accordance with one embodiment.

FIG. 4 depicts an embodiment of an operating sequence 400 between a device application 402, cloud application 404, and system application 406 to configure a augmented or virtual reality device 308 to operate on a private data network.

The device application 402 communicates a physical address of the augmented or virtual reality device 408 to the cloud application 404. In one embodiment this causes the cloud application 404 to generate a scan code based on the physical address of the augmented or virtual reality device 410 and the cloud application 404 communicates the scan code 412 back to the device application 402. In another embodiment, the cloud application 404 communicates the information to encode into the scan code to the device application 402, and the device application 402 generates the scan code.

The device application 402 may then display the scan code 414 so that the system application 406 can scan the scan code 416. The system application 406 communicates the authentication credentials from the scan code 418 to the cloud application 404, and the cloud application 404 communicates a verification signal 420 to the system application 406 and also a physical address of the augmented or virtual reality device 422 that was authenticated. The system application 406 applies the physical address to configure the router of the private data network with the physical address of the augmented or virtual reality device 424, and communicates an SSID and passphrase for the private data network, and the IP address for interacting on the private data network 426 to the cloud application 404 (e.g., IP address of the facility server).

The cloud application 404 communicates the SSID and the passphrase for the private data network, and the IP address provided by the system application 428 to the device application 402. The device application 402 may then pass the SSID and passphrase to the augmented or virtual reality device 430 so that the augmented or virtual reality device 430 can authenticate 308 on the private data network. Alternatively, the cloud application 404 may generate a new scan code comprising the SSID and passphrase for the private data network and the IP address provided by the system application 330. This scan code is scanned directly by the augmented or virtual reality device 430 to initiate network authentication. Once authenticated on the private data network using the SSID and the passphrase 432, and using the IP address, the augmented or virtual reality device 430 may now undertake interaction on the private data network using the IP address provided by the system application 434. In this scenario the user of the augmented or virtual reality device 430 may never gain information about the passphrase, which enhances the security of the private data network.

After some configured period of time the system application 406 may revoke the access by the augmented or virtual reality device 430 to the private data network by removing configuration of the physical address of the augmented or virtual reality device 430 from the private data network router.

Figure 5:
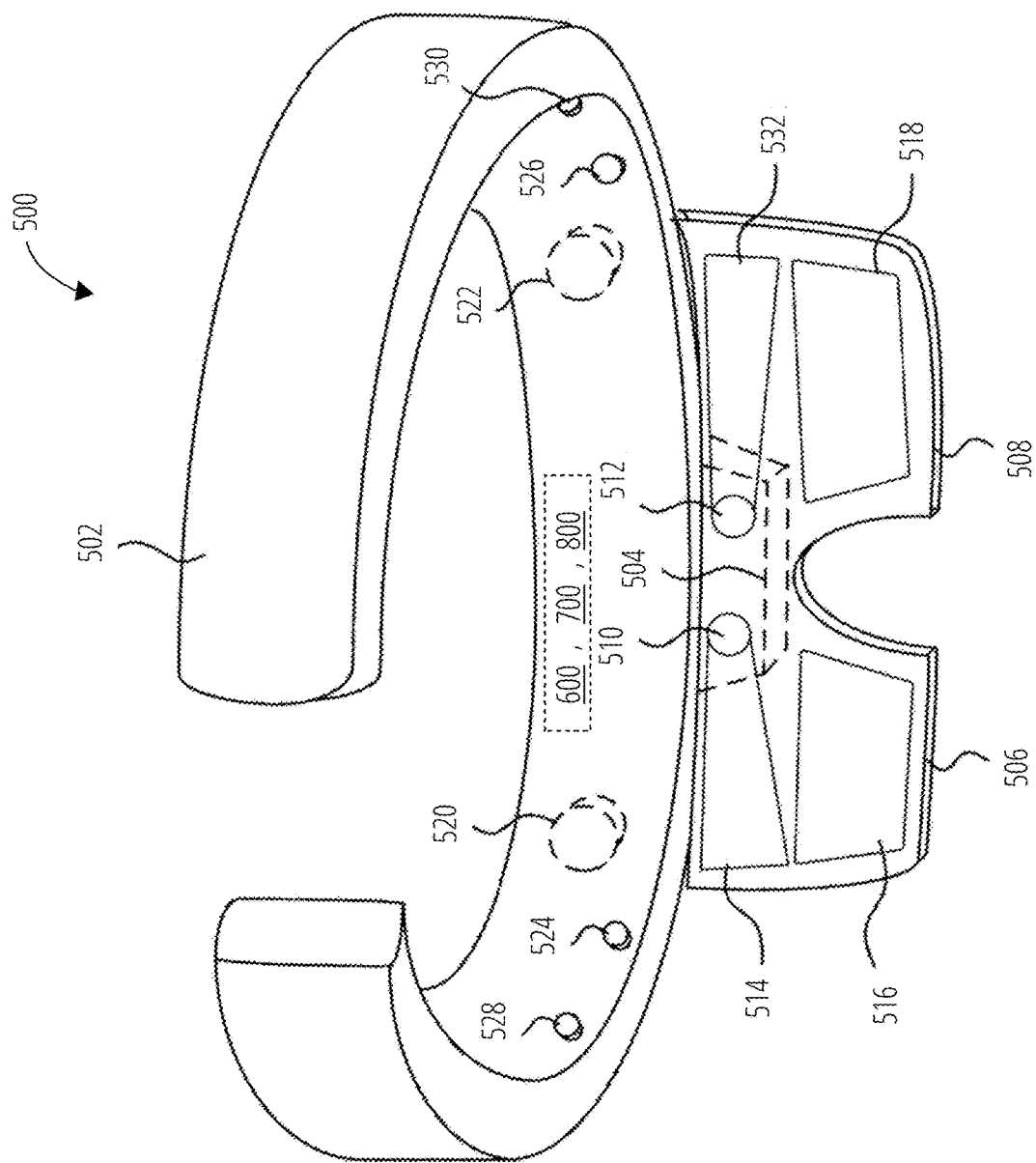
FIG. 5 depicts a device 500 in accordance with one embodiment.

FIG. 5 illustrates a perspective view of an embodiment of a wearable augmented or virtual reality device 500 that may be dynamically provisioned to different systems in accordance with the techniques disclosed herein. The device 500 in this embodiment is a computing device in the form of a wearable headset.

The device 500 comprises a headpiece 502, which is a headband, arranged to be worn on the wearer's head. The headpiece 502 has a central portion 504 intended to fit over the nose bridge of a wearer, and has an inner curvature intended to wrap around the wearer's head above their ears.

Figure 7:
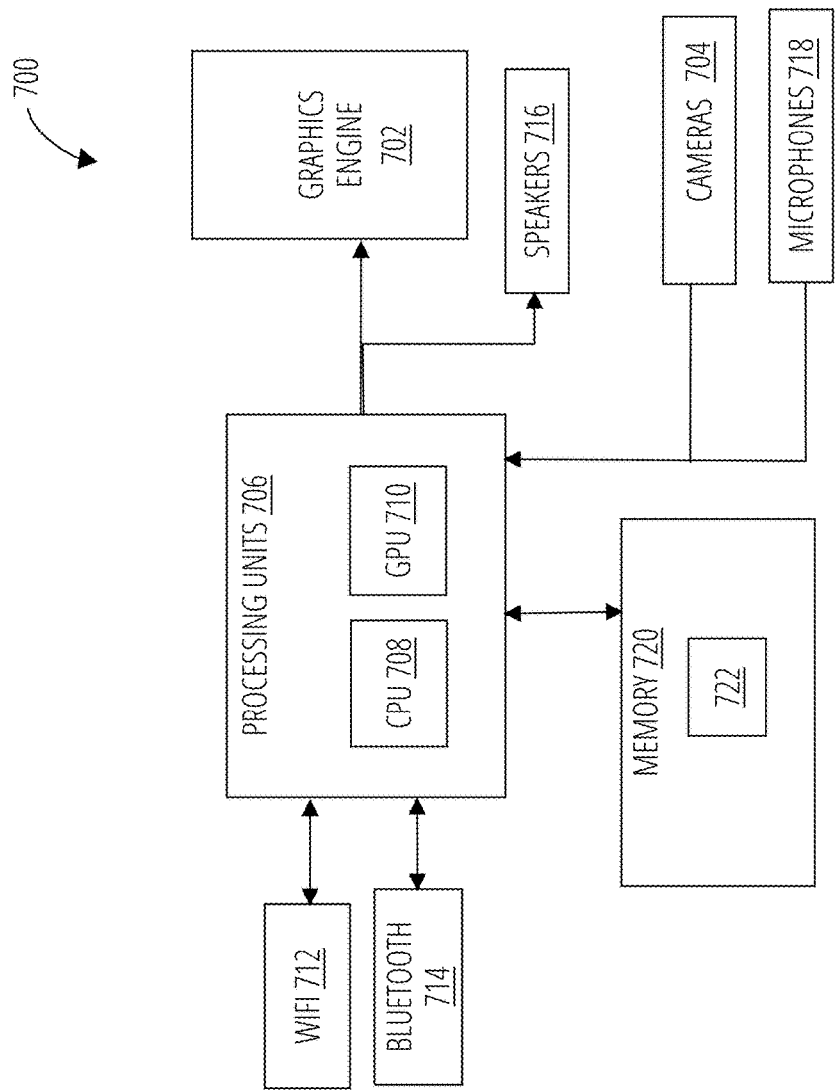
FIG. 7 depicts an augmented reality device logic 700 in accordance with one embodiment.

The headpiece 502 supports a left optical component 506 and a right optical component 508, which are waveguides. For ease of reference herein an optical component will be considered to be either a left or right component, because in the described embodiment the components are essentially identical apart from being mirror images of each other. Therefore, all description pertaining to the left-hand component also pertains to the right-hand component. The device 500 comprises augmented reality device logic 700 that is depicted in FIG. 7.

The augmented reality device logic 700 comprises a graphics engine 702, which may comprise a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine 702. At the exit pupil, the collimated light beams are coupled into each of the left optical component 506 and the right optical component 508 into a respective left in-coupling zone 510 and right in-coupling zone 512. In-coupled light is then guided, through a mechanism that involves diffraction and TIR, laterally of the optical component in a respective left intermediate zone 514 and right intermediate zone 532, and also downward into a respective left exit zone 516 and right exit zone 518 where it exits towards the users' eye.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user. In this manner, the left optical component 506 and the right optical component 508 project the displayed image onto the wearer's eyes.

The various optical zones can, for example, be suitably arranged diffractions gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from multiple graphics engines 702 (i.e. two micro displays), or from the same light engine (i.e. one micro display) using suitable optics to split the light output from the single display.

The device 500 is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or colour. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 506 and right optical component 508 though without the need for the zone structures.

Other headpiece 502 embodiments are also within the scope of the subject matter. For instance, the display optics can equally be attached to the users head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The device 500 also comprises one or more cameras 704—for example left stereo camera 520 and right stereo camera 522 mounted on the headpiece 502 and configured to capture an approximate view ("field of view") from the user's left and right eyes respectfully in this example. The cameras are located towards either side of the user's head on the headpiece 502, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

A left microphone 524 and a right microphone 526 are located at the front of the headpiece (from the perspective of the wearer), and left and right channel speakers, earpiece or other audio output transducers are to the left and right of the headpiece 502. These are in the form of a pair of bone conduction audio transducers functioning as a left speaker 528 and right speaker 530 audio channel output.

Figure 6:
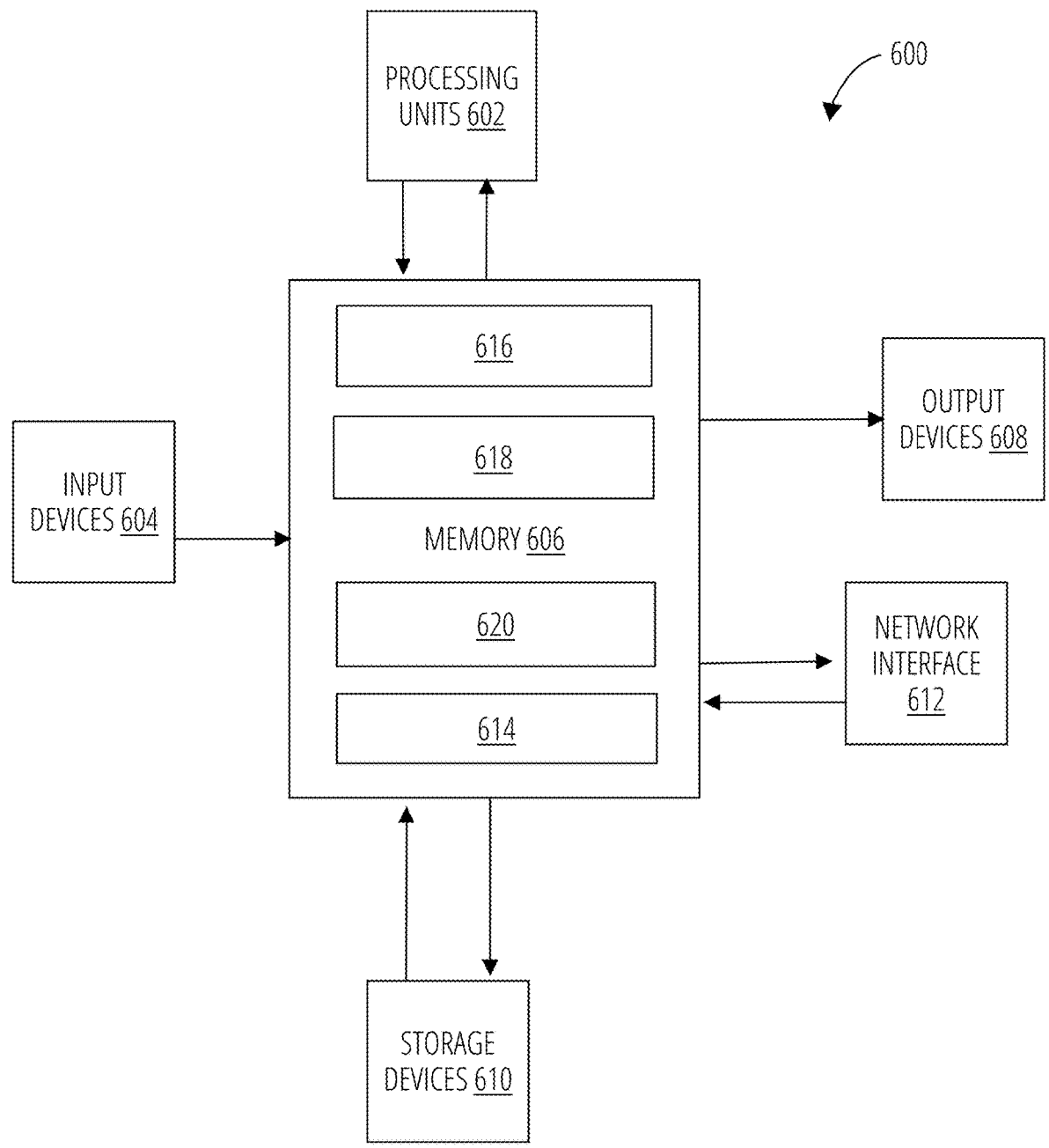
FIG. 6 depicts an Augmented or virtual reality device 600 that may implement aspects of the machine processes described herein.

FIG. 6 depicts an augmented or virtual reality device 600 in additional aspects, according to one embodiment. The augmented or virtual reality device 600 comprises processing units 602, input devices 604, memory 606, output devices 608, storage devices 610, a network interface 612, and various logic 614, 616, 618, 620 configured to carry out aspects of the techniques disclosed herein (e.g., aspects of the routine 300 and operating sequence 400).

The input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory 606.

The memory 606 provides for storage (via configuration of matter or states of matter) of signals received from the input devices 604, instructions and information for controlling operation of the processing units 602, and signals from storage devices 610. The memory 606 may in fact comprise multiple memory devices of different types, for example random access memory devices and non-volatile (e.g., FLASH memory) devices.

Information stored in the memory 606 is typically directly accessible to the processing units 602 of the device. Signals input to the Augmented or virtual reality device 600 cause the reconfiguration of the internal material/energy state of the memory 606, creating logic that in essence forms a new machine configuration, influencing the behavior of the Augmented or virtual reality device 600 by affecting the behavior of the processing units 602 with control signals (instructions) and data provided in conjunction with the control signals.

The storage devices 610 may provide a slower but higher capacity machine memory capability. Examples of storage devices 610 are hard disks, optical disks, large capacity flash memories or other non-volatile memory technologies, and magnetic memories.

The processing units 602 may cause the configuration of the memory 606 to be altered by signals in the storage devices 610. In other words, the processing units 602 may cause data and instructions to be read from storage devices 610 in the memory 606 from which may then influence the operations of processing units 602 as instructions and data signals, and from which it may also be provided to the output devices 608. The processing units 602 may alter the content of the memory 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile.

Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers).

The network interface 612 receives signals from the memory 606 or processing units 602 and converts them into electrical, optical, or wireless signals to other machines, typically via a machine network. The network interface 612 also receives signals from the machine network and converts them into electrical, optical, or wireless signals to the memory 606 or processing units 602.

FIG. 7 depicts components of an exemplary augmented reality device logic 700. The augmented reality device logic 700 comprises a graphics engine 702, a camera 704, processing units 706, including one or more CPU 708 and/or GPU 710, a WiFi 712 wireless interface, a Bluetooth 714 wireless interface, speakers 716, microphones 718, and one or more memory 720. In one embodiment, the memory 720 may comprise instructions that when applied to the processing units 706, configure the processing units 706 to carry out aspects of the techniques disclosed herein (e.g., aspects of routine 300 and operating sequence 400).

The processing units 706 may in some cases comprise programmable devices such as bespoke processing units optimized for a particular function, such as AR related functions. The augmented reality device logic 700 may comprise other components that are not shown, such as dedicated depth sensors, additional interfaces etc.

Some or all of the components in FIG. 7 may be housed in an AR headset. In some embodiments, some of these components may be housed in a separate housing connected or in wireless communication with the components of the AR headset. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality device logic 700.

The memory 720 comprises logic 722 to be applied to the processing units 706 to execute. In some cases, different parts of the logic 722 may be executed by different components of the processing units 706. The logic 722 typically comprises code of an operating system, as well as code of one or more applications configured to run on the operating system to carry out aspects of the processes disclosed herein.

Figure 8:
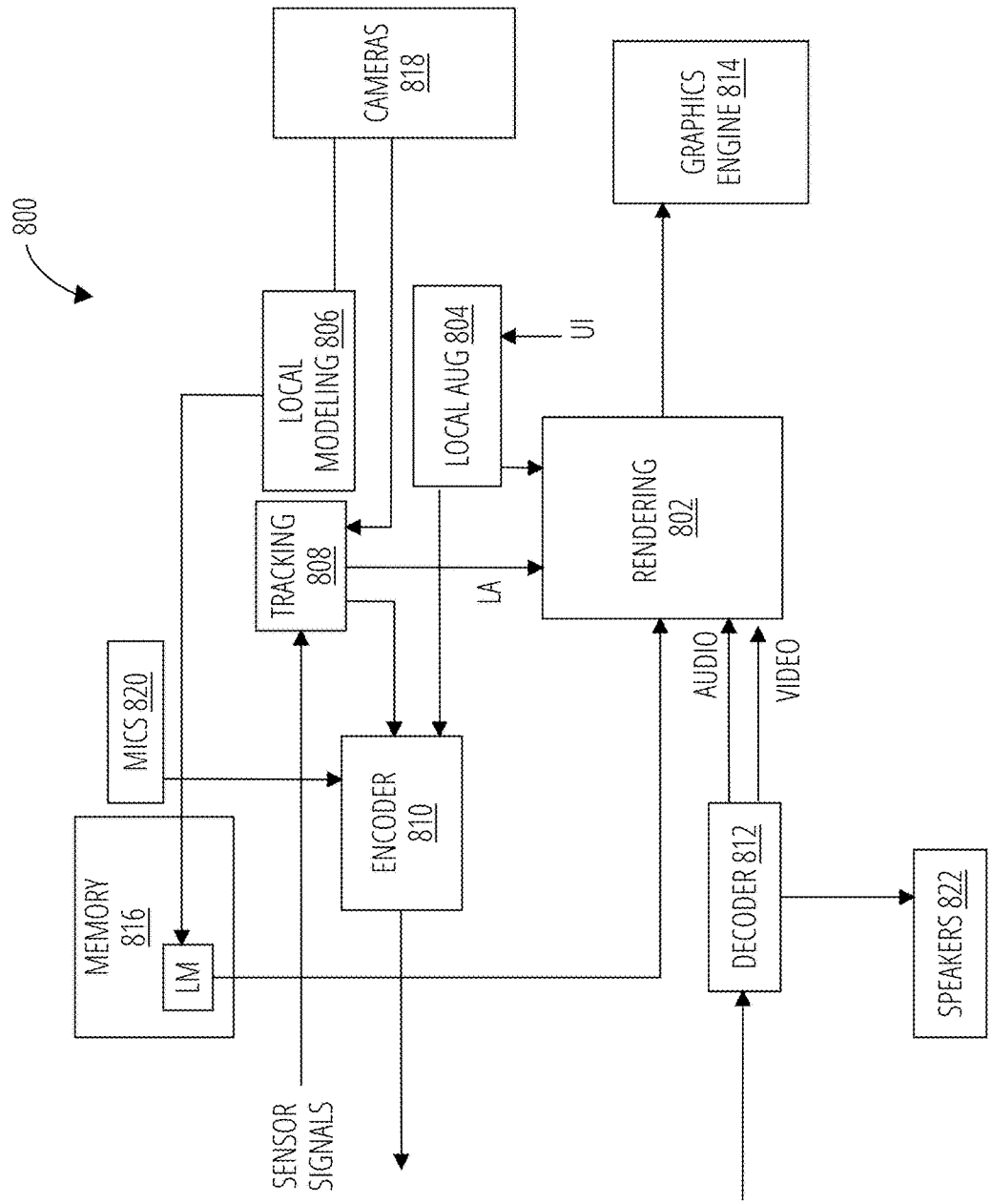
FIG. 8 depicts an Augmented or virtual reality device logic 800 in accordance with one embodiment.

FIG. 8 depicts a functional block diagram of an embodiment of augmented or virtual reality device logic 800. The augmented or virtual reality device logic 800 comprises the following functional modules: a rendering engine 802, local augmentation logic 804, local modeling logic 806, device tracking logic 808, an encoder 810, and a decoder 812. Each of these functional modules may be implemented in software, dedicated hardware, firmware, or a combination of these logic types.

The rendering engine 802 controls the graphics engine 814 to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine 802 rendering at least one virtual display element ("augmentation"), which is perceived as a 3D element, i.e. having perceived 3D structure, at a real-world location in 3D space by the user.

An augmentation is defined by an augmentation object stored in the memory 816. The augmentation object comprises: location data defining a desired location in 3D space for the virtual element (e.g. as (x,y,z) Cartesian coordinates); structural data defining 3D surface structure of the virtual element, i.e. a 3D model of the virtual element; and image data defining 2D surface texture of the virtual element to be applied to the surfaces defined by the 3D model. The augmentation object may comprise additional information, such as a desired orientation of the augmentation.

The perceived 3D effects are achieved though suitable rendering of the augmentation object. To give the impression of the augmentation having 3D structure, a stereoscopic image is generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents structure present in the real world, and the information it provides about this structure allows an augmentation to be displayed as though it were a real-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g. by moving around the object; statically interacting with a real-world object, say by sitting on top of it etc.

Whether or not real-world structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally the criteria can depend on the location and/or orientation of the augmented reality device and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will cause corresponding change in the location and/or orientation of the augmentation. For example, the desired location of an augmentation may be on, and defined relative to, a table top structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mash in this manner, or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modeling logic 806 generates a local 3D model "LM" of the environment in the memory 816, using the AR device's own sensor(s) e.g. cameras 818 and/or any dedicated depth sensors etc. The local modeling logic 806 and sensor(s) constitute sensing apparatus.

The device tracking logic 808 tracks the location and orientation of the AR device, e.g. a headset, using local sensor readings captured from the AR device. The sensor readings can be captured in a number of ways, for example using the cameras 818 and/or other sensor(s) such as accelerometers. The device tracking logic 808 determines the current location and orientation of the AR device and provides this information to the rendering engine 802, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 802 adapts the local model based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

The encoder 810 receives image data from the cameras 818 and audio data from the microphones 820 and possibly other types of data (e.g., annotation or text generated by the user of the AR device using the local augmentation logic 804) and transmits that information to other devices, for example the devices of collaborators in the AR environment. The decoder 812 receives an incoming data stream from other devices, and extracts audio, video, and possibly other types of data (e.g., annotations, text) therefrom.

Machine Embodiments

Figure 9:
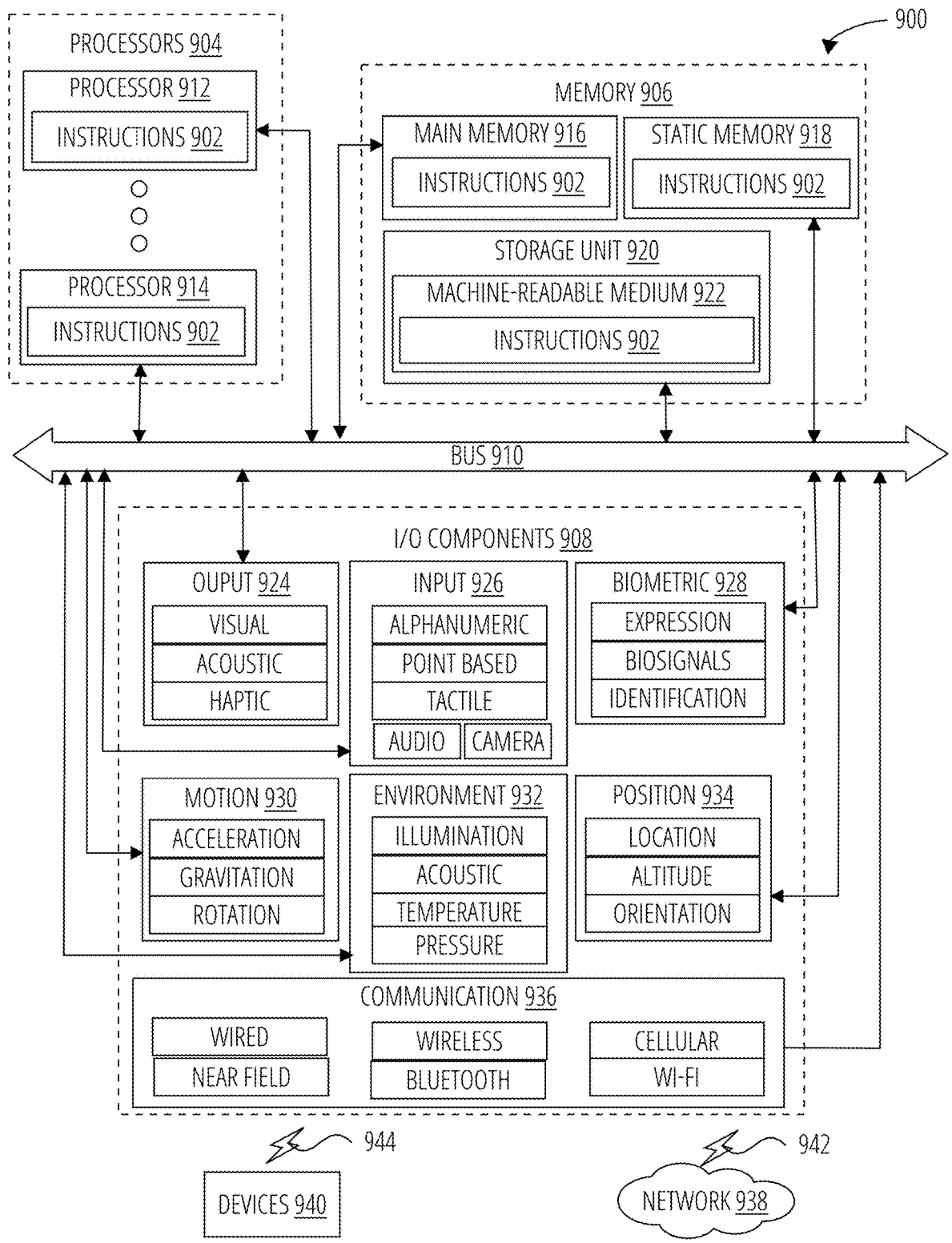
FIG. 9 depicts a machine 900 within which a set of instructions may be executed for causing the machine to perform any one or more of the methodologies discussed herein, according to an example embodiment.

FIG. 9 depicts a diagrammatic representation of a machine 900 in the form of a computer system within which logic may be implemented to cause the machine to perform any one or more of the functions or methods disclosed herein, according to an example embodiment. For example any one of the mobile programmable device 206, cloud application server 212, and system application computer 208 could be implemented in a manner similar to the depicted machine 900.

Specifically, FIG. 9 depicts a machine 900 comprising instructions 902 (e.g., a program, an application, an applet, an app, or other executable code stored in non-volatile static memory 918) for causing the machine 900 to perform any one or more of the functions or methods discussed herein. For example the instructions 902 may cause the machine 900 to carry out aspects of the routine 300 or operating sequence 400, and/or to implement the device application 402, cloud application 404, and/or system application 406. The instructions 902 configure a general, non-programmed machine into a particular machine 900 programmed to carry out said functions and/or methods.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while only a single machine 900 is depicted, the term "machine" shall also be taken to include a collection of machines that individually or jointly execute the instructions 902 to perform any one or more of the methodologies or subsets thereof discussed herein.

The machine 900 may include processors 904, memory 906, and I/O components 908, which may be configured to communicate with each other such as via one or more bus 910. In an example embodiment, the processors 904 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 912 and processor 914) to execute the instructions 902. The term "processor" is intended to include multi-core processors that may comprise two or more independent processors (sometimes referred to as "cores") that may execute instructions contemporaneously. Although FIG. 9 depicts multiple processors 904, the machine 900 may include a single processor with a single core, a single processor with multiple cores (e.g., a multi-core processor), multiple processors with a single core, multiple processors with multiples cores, or any combination thereof.

The memory 906 may include one or more of a main memory 916, a static memory 918, and a storage unit 920, each accessible to the processors 904 such as via the bus 910. The main memory 916, the static memory 918, and storage unit 920 may be utilized, individually or in combination, to store the instructions 902 embodying any one or more of the functionality described herein. The instructions 902 may reside, completely or partially, within the main memory 916, within the static memory 918, within a machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones will likely include a touch input device or other such input mechanisms, while a headless server machine will likely not include such a touch input device. It will be appreciated that the I/O components 908 may include many other components that are not shown in FIG. 9. The I/O components 908 are grouped according to functionality merely for simplifying the following discussion and the grouping is in no way limiting. In various example embodiments, the I/O components 908 may include output components 924 and input components 926. The output components 924 may include visual components (e.g., a display such as a plasma display panel (PDP), a light emitting diode (LED) display, a liquid crystal display (LCD), a projector, or a cathode ray tube (CRT)), acoustic components (e.g., speakers 822), haptic components (e.g., a vibratory motor, resistance mechanisms), other signal generators, and so forth. The input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 908 may include biometric components 928, motion components 930, environmental components 932, or position components 934, among a wide array of possibilities. For example, the biometric components 928 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 may include acceleration sensor components (e.g., accelerometer), gravitation sensor components, rotation sensor components (e.g., gyroscope), and so forth. The environmental components 932 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 934 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 may include communication components 936 operable to couple the machine 900 to a network 938 or devices 940 via a coupling 942 and a coupling 944, respectively. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 906, main memory 916, static memory 918, and/or memory of the processors 904) and/or storage unit 920 may store one or more sets of instructions and data structures (e.g., software) embodying or utilized by any one or more of the methodologies or functions described herein. These instructions (e.g., the instructions 902), when executed by processors 904, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 938 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 938 or a portion of the network 938 may include a wireless or cellular network, and the coupling 942 may be a Code Division Multiple Access (CDMA) connection, a Global System for Mobile communications (GSM) connection, or another type of cellular or wireless coupling. In this example, the coupling 942 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 902 and/or data generated by or received and processed by the instructions 902 may be transmitted or received over the network 938 using a transmission medium via a network interface device (e.g., a network interface component included in the communication components 936) and utilizing any one of a number of well-known transfer protocols (e.g., hypertext transfer protocol (HTTP)). Similarly, the instructions 902 may be transmitted or received using a transmission medium via the coupling 944 (e.g., a peer-to-peer coupling) to the devices 940. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 902 for execution by the machine 900, and/or data generated by execution of the instructions 902, and/or data to be operated on during execution of the instructions 902, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Listing of Drawing Elements 200 system
202 augmented or virtual reality device
204 device application
206 mobile programmable device
208 system application computer
210 system application
212 cloud application server
214 cloud application
216 network
218 router
220 private data network
222 wireless access point
224 operating system
226 device app 228 operating system
230 application
232 operating system
234 service
236 interpreter
238 driver
240 driver
242 driver
244 driver
246 file
248 file
250 plug-in
300 routine
302 block
304 block
306 block
308 block
310 block
312 block
314 block
316 block
318 block
320 block
322 block
324 block
400 operating sequence
402 device application
404 cloud application
406 system application
408 physical address of the augmented or virtual reality device
410 generate a scan code based on the physical address of the augmented or virtual reality device
412 scan code
414 display the scan code
416 scan the scan code
418 authentication credentials from the scan code
420 verification signal
422 physical address of the augmented or virtual reality device
424 configure the router of the private data network with the physical address of the augmented or virtual reality device
426 SSID and passphrase for the private data network, and the IP address for interacting on the private data network
428 the SSID and the passphrase for the private data network, and the IP address provided by the system application
430 augmented or virtual reality device
432 authenticated on the private data network using the SSID and the passphrase
434 interaction on the private data network using the IP address provided by the system application
500 device
502 headpiece
504 central portion
506 left optical component
508 right optical component
510 left in-coupling zone
512 rightin-coupling zone
514 left intermediate zone
516 left exit zone
518 right exit zone
520 left stereo camera
522 right stereo camera
524 left microphone
526 right microphone
528 left speaker
530 right speaker
532 right intermediate zone
600 augmented or virtual reality device
602 processing units
604 input devices
606 memory
608 output devices
610 storage devices
612 network interface
614 logic
616 logic
618 logic
620 logic
700 augmented reality device logic
702 graphics engine
704 camera
706 processing units
708 CPU
710 GPU
712 WiFi
714 Bluetooth
716 speakers
718 microphones
720 memory
722 logic
800 augmented or virtual reality device logic
802 rendering engine
804 local augmentation logic
806 local modeling logic
808 device tracking logic
810 encoder
812 decoder
814 graphics engine
816 memory
818 cameras
820 microphones
822 speakers
900 machine
902 instructions
904 processors
906 memory
908 I/O components
910 bus
912 processor
914 processor
916 main memory
918 static memory
920 storage unit
922 machine-readable medium
924 output components
926 input components
928 biometric components
930 motion components
932 environmental components
934 position components
936 communication components
938 network
940 devices
942 coupling
944 coupling "Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Driver" refers to low-level logic, typically software, that controls components of a device. Drivers often control the interface between an operating system or application and input/output components or peripherals of a device, for example.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreted computer code" refers to instructions in a form suitable for execution by an interpreter.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine language" refers to instructions in a form that is directly executable by a programmable device without further translation by a compiler, interpreter, or assembler. In digital devices, machine language instructions are typically sequences of ones and zeros.

"Module" refers to a computer code section having defined entry and exit points. Examples of modules are any software comprising an application program interface, drivers, libraries, functions, and subroutines.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Programmable device" refers to any logic (including hardware and software logic) who's operational behavior is configurable with instructions.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
  communicating a physical address of an augmented or virtual reality device to a cloud application;

operating the cloud application to generate a first scan code based on the physical address;
the augmented or virtual reality device providing the first scan code to a system application;
the system application retrieving the physical address from the cloud application;
the system application configuring a private data network with the physical address;
the system application communicating to a device application a Service Set Identifier (SSID) and a passphrase for the private data network, and an Internet Protocol (IP) address for the private data network; and authenticating the augmented or virtual reality device on the private data network using the SSID and the passphrase.

2. The method of claim 1, further comprising:
operating the augmented or virtual reality device on the private data network using the IP address for the private data network.

3. The method of claim 1, further comprising:
the system application invoking the cloud application to verify the scan code.

4. The method of claim 1, wherein configuring the private data network with the physical address of the augmented or virtual reality device comprises configuring a router of the private data network to whitelist the physical address.

5. The method of claim 1, wherein the system application communicates to the cloud application the SSID and the passphrase for the private data network, and the IP address for the private data network, in response to verifying the scan code.

6. The method of claim 1, wherein the physical address of the augmented or virtual reality device is communicated to the cloud application via a mobile application.

7. The method of claim 1, wherein the SSID and the passphrase for the private data network, and the IP address for the private data network, are communicated from the system application to the device application via the cloud application.

8. The method of claim 1, further comprising:
expiring an ability of the augmented or virtual reality device to operate on the private data network after a configured period of time.

9. A system comprising:
a plurality of processors;
a plurality of memories comprising instructions that, when applied to the plurality of processors, configure the system to:
receive a physical address of an augmented or virtual reality device at a cloud application;
operate the cloud application to generate a first scan code based on the physical address; provide the first scan code and the physical address from the cloud application to a system application;
configure a private data network with the physical address;
communicate to a device application a Service Set Identifier (SSID) and a passphrase for the private data network, and an Internet Protocol (IP) address for the private data network; and
authenticate the augmented or virtual reality device on the private data network using the SSID and the passphrase.

10. The system of claim 9, the plurality of memories comprising instructions that, when applied to the plurality of processors, further configure the system to:
operate the augmented or virtual reality device on the private data network using the IP address for the private data network.

11. The system of claim 9, the plurality of memories comprising instructions that, when applied to the plurality of processors, further configure the system to:
invoke the cloud application to verify the scan code.

12. The system of claim 9, wherein configuring the private data network with the physical address of the augmented or virtual reality device comprises configuring a router of the private data network to whitelist the physical address.

13. The system of claim 9, the plurality of memories comprising instructions that, when applied to the plurality of processors, further configure the system to:
communicate to the cloud application the SSID and the passphrase for the private data network, and the IP address for the private data network, in response to verifying the scan code.

14. The system of claim 9, wherein the physical address of the augmented or virtual reality device is communicated to the cloud application via a mobile application.

15. The system of claim 9, wherein the SSID and the passphrase for the private data network, and the IP address for the private data network, are communicated from the system application to the device application via the cloud application.

16. The system of claim 9, the plurality of memories comprising instructions that, when applied to the plurality of processors, further configure the system to:
expire an ability of the augmented or virtual reality device to operate on the private data network after a configured period of time.

\* \* \* \* \*